(12) United States Patent
Stockton et al.

(10) Patent No.: US 11,747,220 B2
(45) Date of Patent: Sep. 5, 2023

(54) TRANSDUCER SWITCH

(71) Applicant: Bugeye Technologies, Inc., Union, MO (US)

(72) Inventors: Michael E. Stockton, Bland, MO (US); Richard W. Homeyer, St. James, MO (US); Adam L. Marquart, Ballwin, MO (US)

(73) Assignee: BUGEYE TECHNOLOGIES, INC., Union, MO (US)

(*) Notice: Subject to any disclaimer, the term of this patent is extended or adjusted under 35 U.S.C. 154(b) by 184 days.

(21) Appl. No.: 17/339,457

(22) Filed: Jun. 4, 2021

(65) Prior Publication Data

US 2022/0018721 A1  Jan. 20, 2022

Related U.S. Application Data

(60) Provisional application No. 63/054,035, filed on Jul. 20, 2020.

(51) Int. Cl.
| | |
|---|---|
| *G01L 1/04* | (2006.01) |
| *G01L 5/1627* | (2020.01) |
| *G09B 9/28* | (2006.01) |

(52) U.S. Cl.
CPC ............ *G01L 1/046* (2013.01); *G01L 5/1627* (2020.01); *G09B 9/28* (2013.01)

(58) Field of Classification Search
CPC ... G01L 1/2287; G01L 1/2218; G01L 1/2206; G01L 1/22
See application file for complete search history.

(56) References Cited

U.S. PATENT DOCUMENTS

| | | | | | |
|---|---|---|---|---|---|
| 3,454,920 | A | * | 7/1969 | Mehr | ................. B64C 13/0421 |
| | | | | | 244/236 |
| 3,564,936 | A | * | 2/1971 | Korell | ...................... G05G 9/04 |
| | | | | | 74/483 R |
| 2010/0038808 | A1 | * | 2/2010 | Vogeleer | ............... B30B 11/005 |
| | | | | | 425/148 |

* cited by examiner

*Primary Examiner* — Paul M. West
(74) *Attorney, Agent, or Firm* — Sandberg Phoenix & von Gontard PC

(57) ABSTRACT

A transducer switch includes a housing, a pushbutton switch near the rear of the housing, an input shaft extending from the front of the housing such that an input force can be applied to the input shaft, a positioning spring adapted and configured to resist movement of the input shaft and bias the input shaft towards alignment with the central axis, and a plurality of strain gauges positioned on a sensing portion of the input shaft. The plurality of strain gauges are adapted and configured to measure tension and compression on at least two sides of the input shaft, the two sides separated by approximately ninety degrees.

14 Claims, 2 Drawing Sheets

TRANSDUCER SWITCH

CROSS-REFERENCE TO RELATED APPLICATIONS

This application claims priority to U.S. App. No. 63/054,035 filed Jul. 20, 2020, which is entitled "Transducer Switch" and which is incorporated herein by reference.

STATEMENT REGARDING FEDERALLY SPONSORED RESEARCH

Not Applicable.

BACKGROUND

The present disclosure relates to an analog transducer type switch. Transducer switches are typically included in flight control systems, simulated flight controls, or other vehicles and vehicle simulators. For example, multi-axis transducer type switches may be included on a flight control stick and used for providing inputs related to trimming an aircraft, managing displays, selecting weapons, providing a cursor input, or the like.

Typical transducer switches have limited fidelity, non-adjustable input forces, and suffer from short-life cycles. Typical transducer switches are also purpose made for a specific application and do not meet the needs for use in a variety of applications.

BRIEF SUMMARY

Briefly, a transducer switch is disclosed that has a long life cycle (preferably at least one million cycles), has adjustable input forces, and has a lower cost to manufacture than existing transducer switches. The transducer switches are suitable, in part due to the adjustable input forces, for use with a variety of control systems and simulated control systems for rotary-wing aircraft, fixed-wing aircraft, tanks, or other vehicles. The transducer switches also provide for a pushbutton switch that can be actuated at any time during use of the transducer switch.

In one embodiment, a transducer switch includes a housing, a pushbutton switch, an input shaft, a positioning spring, and a plurality of strain gauges. The housing is adapted and configured to allow for mounting of the transducer switch, the housing extending longitudinally between a front and a rear. The pushbutton switch within the housing is positioned nearer the rear of the housing than the front of the housing. The input shaft extends from the front of the housing such that an input force can be applied to the input shaft, at least a portion of the input shaft being positioned between the pushbutton switch and the front of the housing. The input shaft includes an input segment, a sensing portion, a retaining flange portion, and an end portion. The input segment has a first diameter and extends longitudinally along a central axis. The sensing portion of the input shaft is adapted and configured to elastically deform under an input force such that the deformation can be measured and used to provide an input signal to a device corresponding to movement of the input shaft along X and Y axes, the X and Y axes being generally perpendicular to the central axis. The retaining flange portion extends radially from the central axis of the input shaft and beyond the first diameter. The retaining flange portion is adapted and configured to permit the input shaft to be retained longitudinally within the housing of the transducer switch, and the retaining flange portion has a concave radiused shoulder extending radially inward to a second diameter, the second diameter being greater than the first diameter. The concave radiused shoulder also extends longitudinally away from the input segment of the input shaft. The end portion of input shaft extends axially along the central axis and has a rounded terminus. The rounded terminus is adapted and configured to tangentially contact the pushbutton switch throughout a range of motion of the input shaft. The positioning spring of the transducer switch is located between the retaining flange portion and the rear of the housing. The positioning spring is adapted and configured to resist movement of the input shaft in the longitudinal direction toward the rear of the housing, and the positioning spring is adapted and configured to bias the input shaft towards alignment with the central axis. The plurality of strain gauges of the transducer switch are positioned on the sensing portion of the input shaft. The plurality of strain gauges adapted and configured to measure tension and compression on at least two sides of the input shaft, the two sides separated by ninety degrees.

DESCRIPTION OF THE DRAWINGS

In the accompanying drawings which form part of the specification.

DETAILED DESCRIPTION

Figure 1:
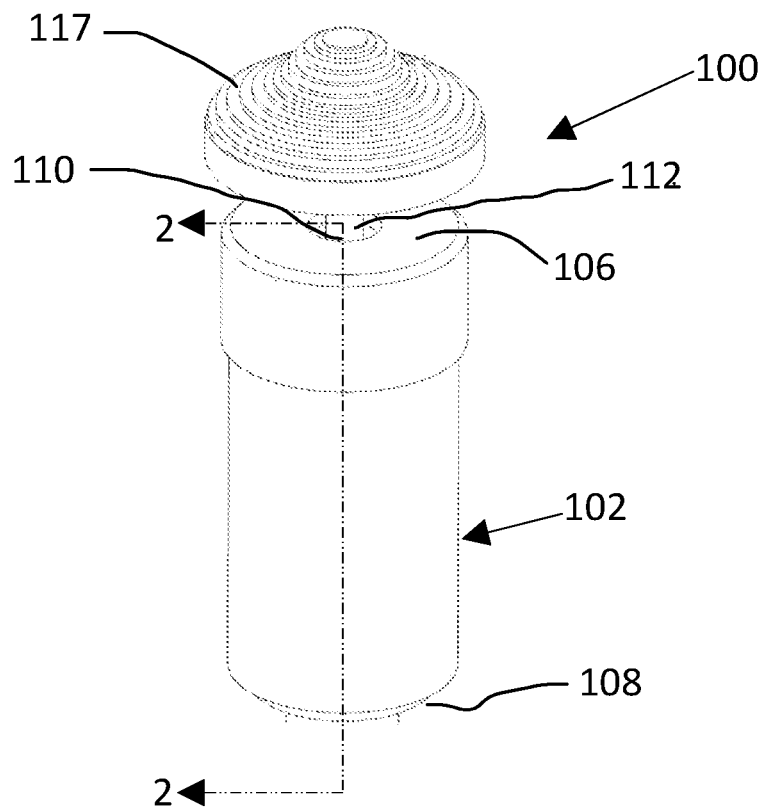
FIG. 1 is a perspective view of an illustrative embodiment of a transducer switch.

The following detailed description, in conjunction with the drawings, describes and illustrates a transducer switch by way of example and not by way of limitation. The description enables one skilled in the art to make and use the disclosed transducer switch, describes several embodiments, adaptations, variations, alternatives, and uses of the transducer switch, including what is presently believed to be the best mode of making and using the transducer switch. Additionally, it is to be understood that the disclosed transducer switch is not limited in its application to the details of construction and the arrangements of components set forth in the following description or illustrated in the drawings. The transducer switch disclosed is capable of other embodiments and of being practiced or being carried out in various ways. Also, it is to be understood that the phraseology and terminology used herein is for the purpose of description and should not be regarded as limiting.

Referring generally to FIGS. 1-4B, a transducer switch 100 is depicted. The transducer switch 100, as will be described in more detail, is adapted and configured to receive inputs that are from between one and five pounds of force. The input is converted to a linear voltage used to control a system.

Figure 2:
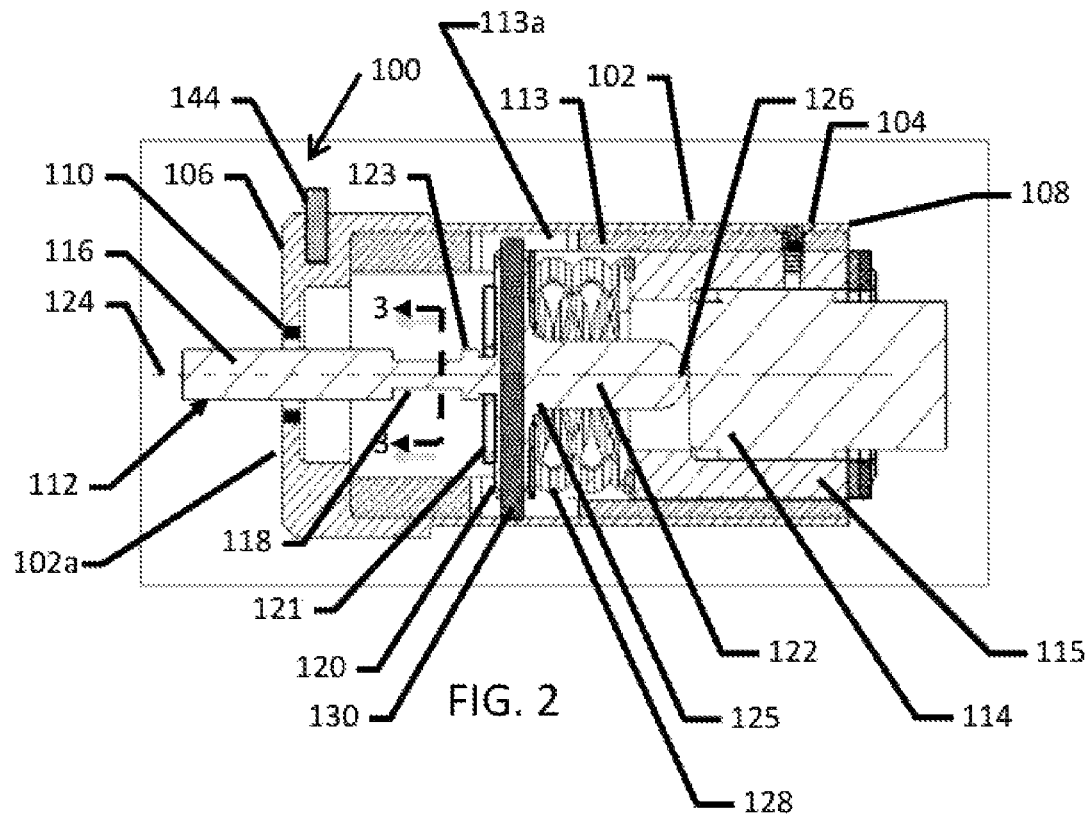
FIG. 2 is a schematic partial sectional view of the transducer taken along line 2-2 of FIG. 1.

Referring specifically to FIGS. 1 and 2, the transducer switch 100 includes a housing 102 that facilitates mounting of the transducer switch 100 to other equipment. For example, and without limitation, the housing 102 may include mounting hardware such as brackets (not shown) or threaded portions 104 such that the transducer switch 100 may be secured to other hardware with fasteners, or the like. The housing is substantially cylindrical and extends longitudinally between a front (or top) 106 and a rear (or bottom) 108. Although shown as cylindrical (and thus with a circular cross-section), the housing 102 could have any desired cross-sectional shape. The housing 102 includes a top surface 102a defining an aperture 110 through which an input shaft 112 extends from within the housing 102. The housing additionally includes a cylinder 113 which is received in the housing, and an inner sleeve 115 which is secured in the cylinder 113. The cylinder 113 and sleeve 115 can be secured in the housing 102 by means of a screw, for example. The cylinder 113 extends from the bottom 108 of the housing to the in inner surface of the housing top. The sleeve 115 extends from the bottom of the cylinder 113 (and thus the bottom of the housing 102) a distance about one half the length of the cylinder 113.

The input shaft 112 is adapted and configured to allow for a user to interact with the input shaft 112 such that the interaction may be measured and translated into an input for another system. This includes motion in two axes (e.g., along a vertical axis and a horizontal axis) and actuation of a pushbutton switch 114. The pushbutton switch 114 is received in the inner sleeve 115 nearer the rear 108 than the front 106 of the housing. As shown in FIG. 2, the pushbutton switch extends from the rear 108 of the housing. The pushbutton switch 114 is actuated when the input shaft 112 is depressed into the housing 102. In some embodiments, the input shaft 112 is capped with a button 117 of any suitable type. Alternatively, the input shaft 112 can be uncapped.

The input shaft 112 extends from the front 106 of the housing 102 such that an input force can be applied to the input shaft 112. The remainder of the input shaft 112 is positioned between the pushbutton switch 114 and the front 106 of the housing 102. The majority of the input shaft 112 is contained within the housing 102.

The input shaft 112 includes a plurality of segments including an input segment 116, a sensing portion 118, a retaining flange 120, and an end portion 122. The input segment 116 has a first diameter and extends longitudinally along a central axis 124 of the transducer housing (when the input shaft 112 is in the null position). The input segment 116 is sized to permit a user to interact with the input shaft 112 in its entirety, for example, by manipulating the input segment 116 with a thumb or finger. The input segment 116 optionally includes threads for coupling the button 117 to the input shaft 112. The input segment 116 extends through the aperture 110 and into the housing 102.

The input segment 116 transitions to the sensing portion 118. As shown in FIG. 2, the transition comprises a substantially 90° angle. That is, the upper surface of the sensing portion 118 defines an approximate right angle with the input segment 116. The sensing portion 118 has a diameter less than that of the input segment 116. This reduced diameter allows for the sensing portion 118 to more easily flex. As described later in greater detail, the flexing of the input shaft 112 is measured using a plurality of strain gauges to provide a signal to a device to be controlled. The decreased diameter allows the sensing portion 118 to flex to a greater degree than the input segment 116, therefore increasing the sensitivity of the transducer switch 100 overall. Generally, pushing the input shaft 112 in one direction in a plane generally perpendicular to an axis of the housing and of the input shaft 112 causes the sensing portion 118 to compress on the side opposite the input force and elongate on the side receiving the input force. These changes are measured to determine the input. In other words, the sensing portion 118 is adapted and configured to elastically deform under an input force such that the deformation can be measured and used to provide an input signal to a device. The sensing portion 118 is used to measure inputs along a plane generally perpendicular to the central axis 124 (e.g., X-Y input).

The sensing portion 118 of the input shaft 112 transitions to a retaining flange 120. The retaining flange 120 is adapted and configured to retain the input shaft 112 partially within the housing 102 while permitting limited movement of the input shaft 112 axially and transversely (e.g., radially about the X-Y plane). The retaining flange portion 120 extends radially from the central axis 124. The diameter of the retaining flange 120 is greater than the diameter of the input segment 116. As seen, the retaining flange portion has a dimension greater than the inner diameter of the cylinder 113. The cylinder 113 thus includes axially extending slots 113a into which the retaining flange portion 120 extends. The dimension of the retaining flange portion 120 and the axial length of the slots in the cylinder 113 will, in part, define the extent to which the input shaft 112 can be pivoted. A retaining element 121, such as a retaining nut or c-clip, extends around the input shaft 116 such that the retaining flange 120 cannot exit the housing 102. The retaining element 121 may be captive on the input shaft 112 by a stop 123. The retaining flange portion 120 also includes a concave radiused shoulder 125 at its junction with the end portion 122 facing the rear 108 of the housing 102 (e.g., extending longitudinally away from the input segment 116). The concave radiused shoulder 125 reduces the diameter of the retaining flange 120 to a diameter that is greater than the diameter of the input segment 116 of the input shaft 112. The radiused shoulder 125 transitions the retaining flange portion 120 to the end portion 122.

The end portion 122 extends axially along the central axis 124. The end portion 122 terminates at a rounded terminus 126. The rounded terminus 126 is adapted and configured to tangentially contact the pushbutton switch 114 throughout a range of motion of the input shaft 112. The rounded terminus 126 may be hemispherical or otherwise rounded. Such a shape permits the input shaft 112 to move relative to the pushbutton switch 114 while maintaining contact with the pushbutton switch, the pushbutton switch 114 being tangential to the rounded terminus 126 throughout the movement of the input shaft 112.

In order to prevent inadvertent actuation of the pushbutton switch 114 and/or to maintain the input shaft 112 in a null position centered on the central axis 124 absent an input force, the end portion 122 of the input shaft 112 extends through a positioning spring 128. The positioning spring 128 is located between the retaining flange 120 and a top surface of the sleeve 115 of the housing 102. The positioning spring 128 is adapted and configured resist movement of the input staff 112 in the longitudinal direction toward of the rear 108 of the housing 102. The positing spring 128 is further adapted and configured to bias the input shaft 112 towards alignment with the central axis 124. The positioning spring 128 resists longitudinal motion by interacting with the retaining flange portion 120 and the sleeve 115 such that the spring is compressed when the input shaft 112 is depressed.

The positioning spring 128 biases the input shaft 112 towards alignment with the central axis 124 by interacting with the end portion 122 of the input shaft 112 that extends through the positioning spring 128. The positioning spring 128 also interacts with the shoulder 125 which has a radius matching the circular profile of the positioning spring (e.g., a coil spring, and preferably a flat coil). In such a case, the turn of the positioning spring 128 adjacent the shoulder 125 has substantially no pitch. As the input shaft 112 is moved laterally from the central axis 124, one side of the positioning spring 128 compresses and the other side elongates. This deformation is resisted by the elasticity of the spring which causes the input shaft 112 to return to its normal position when the force on the input shaft 112 is removed.

Alternatively, the positioning spring 128 centers the input shaft 112 on the central axis 124 by having an inner diameter that is less than that of the shoulder 125. In operation, the shoulder 125 applies a lateral force to the biasing spring 128 spreading the turn of the spring. This is resisted by the biasing spring 128 which is centered on the central axis 124 such that the input shaft 112, as a whole, is biased towards alignment with the central axis 124.

In some embodiments, the positioning spring 128 is pre-loaded such that the positioning spring is in compression even in the absence of an input force being applied to the input shaft 112. A pre-loaded positioning spring advantageously results in a linear feedback force resisting movement of the input shaft 112. There is no deadzone in which force applied to the input shaft 112 allows the input shaft 112 to move without haptic feedback. In other words, a user feels any input as being resisted with linearly increasing force and feels such feedback immediately due to the positioning spring 128 being pre-loaded. This results in enhanced feedback which permits more precise inputs to be made using transducer switch 100. This effect can apply to longitudinal motion of the input shaft 112 (e.g., to actuate the pushbutton switch 114) and/or to lateral motion of the input shaft (e.g., to affect a lateral X-Y plane input).

In one embodiment, the radiused shoulder 125 of the input shaft pre-loads the biasing spring 128 by compressing the biasing spring 128 as the input shaft 112 is secured to the housing 102. The shoulder 125 may also preload the biasing spring 128 by spreading one or more turns of the spring as the diameter of the input shaft 112 increases along the radius of the shoulder 125. In still further embodiments, the biasing spring 128 is adjustably pre-loaded by tightening the retaining element 121 to compress the biasing spring 128. Tightening the retaining element 121 compresses the biasing spring 128 longitudinally and also elongates the spring laterally, thus pre-loading the biasing spring in both directions.

In some embodiments, the transducer 100 includes a circuit card 130. The circuit card 130 is coupled to or integrated with the input shaft 112 (and is positioned on, or extends through, the retaining flange 120) and provides for an electrical connection for the strain gauges (shown in FIGS. 3A and 4A). The circuit card 130 includes electronics for detecting inputs using the strain gauges including, for example, completion resistors. The circuit card 130 may also provide for an electrical connection to the pushbutton switch 114. The circuit card 130 provides several input and output connections that pass through the housing 102. In alternative embodiments, the circuit card 130 is not coupled to the input shaft 112. Rather, the input shaft 112 passes through an opening in the circuit card 130 (such that the circuit card effectively defines the flange 120). In still further embodiments, one or more components related to sensing inputs are located outside the housing 102 of the transducer 100.

Figure 3A:
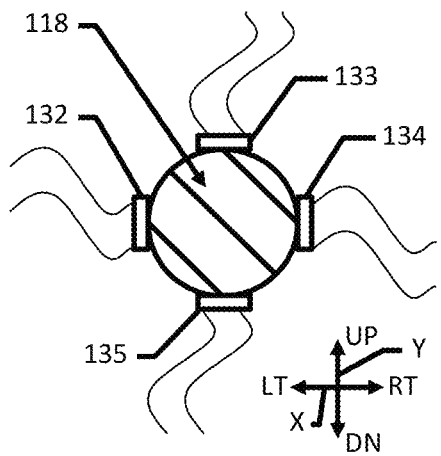
FIG. 3A is partial sectional view of the transducer switch taken along the line 3-3 of FIG. 2 and illustrates the placement of strain gauges within the transducer switch.

Referring now to FIG. 3A, the sensing portion 118 of the input shaft 112 has a plurality of (and preferably four) strain gauges 132-135. Each strain gauge 132-135 is an element that changes resistivity in proportion to strain. Each of the strain gauges 132-135 changes resistivity as a function of whether the part of the sensing portion 118 of the input shaft 112 being measured is in compression or tension, and the degree of such compression or tension. The first strain gauge 132 is positioned to measure compression and tension on the left side (LT) of the sensing portion 118, with reference to FIG. 3A. As the input shaft 112 is moved to the right, the left side of the sensing portion 118 will be placed in tension such that the resistivity of the first strain gauge 132 increases. As the input shaft 112 is moved to the left, the left side of the sensing portion 118 will be placed in compression such that the resistivity of the attached first strain gauge 132 decreases.

The second strain gauge 133 is positioned to measure compression and tension on the side corresponding to an upward input (UP) of the sensing portion 118, with reference to FIG. 3A. As the input shaft 112 is moved upward, the top portion of the sensing portion 118 is placed in compression and as a result the second strain gauge 133 is compressed resulting in a lower resistivity. When the input shaft 112 is moved downward, the top portion of the sensing portion 118 is placed in tension resulting in a greater resistivity of the second strain gauge 133.

The third strain gauge 134 is positioned on the right side of the sensing portion 118 of the input shaft 112, with reference to FIG. 3A. The third strain gauge 134 is positioned opposite the first strain gauge 132 such that the movement of input shaft 112 results in an opposite change in resistivity to that of the first strain gauge 132. If the input shaft 112 is moved to the right, the first strain gauge 132 increases in resistivity as it is in tension and the third strain gauge 134 decreases in resistivity as it is in compression.

The fourth strain gauge 135 is positioned to measure compression and tension on the side corresponding to a downward input (DN) of the sensing portion 118, with reference to FIG. 3A. The fourth strain gauge 135 is positioned opposite the second strain gauge 133 such that the movement of the input shaft 112 results in an opposite change in resistivity to that of the second strain gauge 133. If the input shaft 112 is moved upward, the second strain gauge 133 decreases in resistivity as it is in compression along with the upward facing portion of the sensing portion 118, and the fourth strain gauge 135 increases in resistivity as it is tension along with the downward facing side of the sensing portion 118.

Figure 3B:
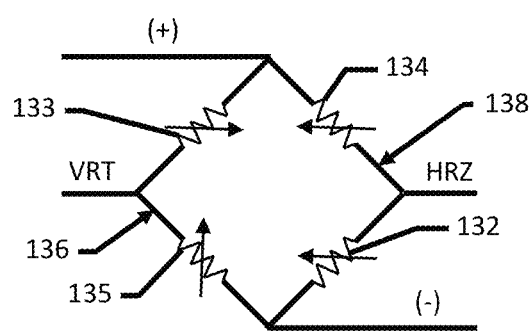
FIG. 3B is a schematic wiring diagram illustrating the wiring of the strain gauges of FIG. 3A in a full Wheatstone Bridge configuration.

Referring now to FIG. 3B, the first through fourth strain gauges 132-135 are arranged in a full Wheatstone Bridge configuration. The Wheatstone Bridge circuit has a supply voltage across the circuit. A first leg 136 of the Wheatstone Bridge is configured to measure movement of the input shaft 112 along the vertical axis (Y axis, up and down). To measure movement of the input shaft 112 along the vertical access, the change in voltage is measured at the VRT point. With the second strain gauge 133 and fourth strain gauge 135 arranged on opposite sides of the VRT point, the second and fourth strain gauges function as a voltage divider. As the resistances of the second 133 and fourth 135 strain gauges change in response to movement of the input shaft 112, the voltage along the first leg 136 is divided differently. As the resistance of the fourth strain gauge 135 increases (e.g., in response to upward movement of the input shaft 112), the voltage measured at the VRT point increases. Comparing the voltage at the VRT point to a baseline voltage, movement of the input shaft 112 can be determined. The baseline voltage is established with the input shaft at the center position (aligned with the central axis 124) and will be half the supply voltage, the resistance of the second 133 and fourth 135 strain gauges being equal.

Similarly, a second leg 138 of the Wheatstone Bridge is configured to measure movement of the input shaft 112 along the horizontal access (X axis, left and right). To measure movement of the input shaft 112 along the horizontal axis, the change in voltage is measured at the HRZ point. With the first 132 and third strain gauge 134 arranged on opposite sides of the HRZ point, the first and third strain gauges function as a voltage divider. As the resistances of the first 132 and third strain gauges 134 change in response to movement of the input shaft 112, the voltage along the second leg 138 is divided differently. With the supply voltage across the Wheatstone Bridge circuit held constant, the different division of that voltage is measured to measure the movement of the input shaft 112. Comparing the voltage at the HRZ point to the baseline voltage at the HRZ point, horizontal movement of the input shaft 112 can be determined.

By measuring the voltage at the VRT point and HRZ point simultaneously, input can be measured that includes both vertical and horizontal components. In other words, the plurality of strain gauges are able to measure diagonal and non-linear input of a user.

Figure 4A:
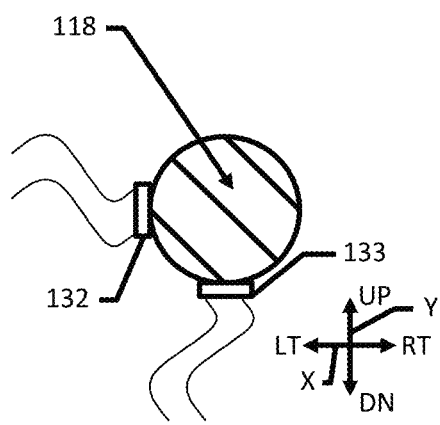
FIG. 4A is a partial schematic view of the transducer switch taken along the line 3-3 of FIG. 2 and illustrates a second embodiment of the placement of strain gauges within the transducer switch.

In an alternative embodiment depicted in FIG. 4A, the plurality of strain gauges used to measure the movement of the input shaft 112 includes only a first strain gauge 132 and a second strain gauge 133. The first strain gauge 132 is positioned on the left side of the sensing portion 118, with reference to FIG. 3A, in order to measure left and right movement of the input shaft 112 (along the X axis). The second strain gauge 133 is positioned on the downward facing side of the sensing portion 118, with reference to FIG. 3A, in order to measure up and down movement of the input shaft 112 (along the Y axis).

Figure 4B:
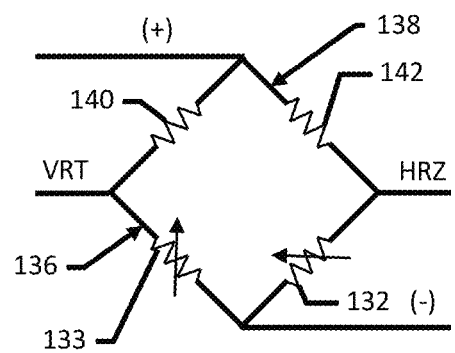
FIG. 4B is a schematic wiring diagram illustrating the wiring of the strain gauges of FIG. 4A in a half Wheatstone Bridge configuration.

Referring to FIG. 4B, in the alternative embodiment having only the first 132 and second strain gauge 133, the first and second strain gauges are arranged in a half Wheatstone Bridge configuration. A first leg 136 of the half Wheatstone Bridge includes the second strain gauge 133 and a first completion resistor 140. The second strain gauge 133 and the first completion resistor 140 are positioned on opposite sides of the VRT point such that the two elements function as a voltage divider in the manner previously described. The first completion resister 140 is adapted and configured to have a resistance approximating the resistance of the second strain gauge 133 when the second strain gauge 133 is in the null position. Resistivity of the completion resistor 140 does not change with movement of the input shaft 112. As the second strain gauge 133 increases and decreases in resistivity due to movement of the input shaft 112, the voltage across the first arm 136 is divided differently such that the voltage at the VRT point can be measured to determine movement of the input shaft 112.

The second leg 138 of the half Wheatstone Bridge includes the first strain gauge 132 and a second completion resistor 142. The first strain gauge 132 and the second completion resistor 142 are positioned on opposite sides of the HRZ point such that the two elements function as a voltage divider in the manner previously described. As with the first leg 136, the first strain gauge 132 changes in resistivity as the input shaft 112 moves horizontally such that the voltage at the HRZ point changes. The second completion resistor 142 does not change in resistivity as the input shaft 112 moves.

Referring generally to FIGS. 3A-4B, the full Wheatstone Bridge configuration has several advantages including automatic temperature correction. However, the full Wheatstone Bridge requires four strain gauges. The half Wheatstone Bridge only uses two strain gauges which simplifies construction and reduces cost in comparison to the full Wheatstone Bridge configuration. In either configuration, the strain gauges are aligned with the axes along which movement is being measured. This is shown in FIGS. 3A and 4A. If the strain gauges are not aligned with the axes they are measuring, strain gauges that measure movement along a particular axis will also incidentally be affected by movement of the input shaft 112 along the other axis. This mixed input can be compensated for through calibration, but proper alignment of the strain gauges to the axes reduces or eliminates the need for such calibration.

In either the full Wheatstone Bridge configuration or the half Wheatstone Bridge configuration, movement is measured based on the voltage measured using the strain gauge(s) corresponding to the axis of movement which is being measured. For example, and without limitation, the detected voltage difference from normal (e.g., the undivided supply voltage) is multiplied by a factor determined experimentally to correspond with a particular corresponding measured amount of movement from the normal position.

Referring again to FIGS. 1-2, proper alignment of the input shaft 112 and the transducer 100 is important in order for inputs to be properly sensed (e.g., measurement is enhanced when the strain gauges are aligned with the axes of input). To align the input shaft 112 relative to the transducer housing 102, the input shaft 112 is secured within the transducer switch 100 such that linear motion along the central axis 124 and translational movement generally perpendicular to the central axis 124 (e.g., along an X-Y plane) is permitted but rotational movement of the input shaft is not permitted. For example, and without limitation, the input shaft 112 may be bonded to the retaining element 121. Alternatively, the input shaft 112, specifically the shoulder 125, is bonded to the positioning spring 128 to prevent rotation of the input shaft 112. In still further alternative embodiments, the input shaft 112 may be keyed such that the input shaft 112 is allowed to move longitudinally and transversely but is not allowed to rotate. By prohibiting rotation of the input shaft 112 about the central axis 124, the strain gauges on the sensing portion 118 remain aligned with the measurement axes.

Similarly, accuracy and operation of the transducer switch 100 is improved by aligning the transducer switch 100 with another component (e.g., a joystick, equipment housing, mount, or the like) such that the measurement axes align with the intended input. In other words, the vertical axis of the sensing portion 118 and the corresponding strain gauges are aligned with true vertical if the transducer switch 100 is mounted on a wall or, for example, if the vertical axis is coaxial with the centerline of a vehicle when the transducer switch is incorporated into a vehicle joystick. To properly align the transducer switch 100, the transducer switch 100 includes an alignment feature 144. For example, and without limitation, the alignment feature 144 can be an alignment pin that is adapted and configured to slot into a channel thereby ensuring that the transducer switch 100 can only be installed in a single orientation. In alternative embodiments, the alignment feature 144 can be a visual indicator only.

Changes can be made in the above constructions without departing from the scope of the disclosure. It is intended that all matter contained in the above description or shown in the accompanying drawings shall be interpreted as illustrative and not in a limiting sense.

We claim:

1. A transducer switch comprising:
a housing adapted and configured to allow for mounting of the transducer switch, the housing extending longitudinally between a front and a rear;
a pushbutton switch within the housing and positioned nearer the rear of the housing than the front of the housing;
an input shaft extending from the front of the housing such that an input force can be applied to the input shaft, at least a portion of the input shaft being positioned between the pushbutton switch and the front of the housing, the input shaft comprising:
an input segment having a first diameter and extending longitudinally along a central axis;
a sensing portion, the sensing portion of the input shaft adapted and configured to elastically deform under an input force such that the deformation can be measured and used to provide an input signal to a device corresponding to movement of the input shaft along X and Y axes, the X and Y axes being generally perpendicular to the central axis;
a retaining flange portion extending radially from the central axis of the input shaft and beyond the first diameter, the retaining flange portion adapted and configured to permit the input shaft to be retained longitudinally within the housing of the transducer switch, and the retaining flange portion having a concave radiused shoulder extending radially inward to a second diameter, the second diameter being greater than the first diameter, the concave radiused shoulder also extending longitudinally away from the input segment of the input shaft; and
an end portion extending axially along the central axis and having a rounded terminus, the rounded terminus adapted and configured to tangentially contact the pushbutton switch throughout a range of motion of the input shaft;
a positioning spring located between the retaining flange portion and the rear of the housing, the positioning spring adapted and configured to resist movement of the input shaft in the longitudinal direction toward the rear of the housing, and the positioning spring being adapted and configured to bias the input shaft towards alignment with the central axis; and
a plurality of strain gauges positioned on the sensing portion of the input shaft, the plurality of strain gauges adapted and configured to measure tension and compression on at least two sides of the input shaft, the two sides separated by approximately ninety degrees.

2. The transducer switch of claim 1, the positioning spring being at least one of a flat coil spring or a coil spring having a circular profile in cross-section such that the profile of the coil spring matches the radiused shoulder of the retaining flange.

3. The transducer switch of claim 2, wherein the turn of the coil spring adjacent the shoulder of the retaining flange has substantially no pitch such that the coil spring and the shoulder are in substantial contact.

4. The transducer switch of claim 1, wherein the positioning spring is pre-loaded such that the positioning spring exerts a centering force on the input shaft such that the input shaft is aligned with the central axis.

5. The transducer switch of claim 4, wherein the positioning spring is pre-loaded such that the positioning spring exerts a force on the input shaft such that the input shaft is biased in a direction away from the pushbutton switch.

6. The transducer switch of claim 1, wherein the sensing portion of the input shaft has a diameter less than that of the first diameter of the input segment of the input shaft.

7. The transducer switch of claim 1, wherein the transducer switch includes a retaining element positioned longitudinally between the retaining flange and the front of the housing, the retaining element adapted and configured to retain the input shaft within the housing and setting a limit to input shaft movement in the longitudinal direction toward the front of the housing.

8. The transducer switch of claim 7, wherein the retaining element is a retaining nut that is adapted and configured to be removable such that one or more of the input shaft or the positioning spring is replaceable with components having different characteristics.

9. The transducer switch of claim 1 further comprising a circuit card, the plurality of strain gauges being electrically coupled to the circuit card.

10. The transducer switch of claim 9 wherein the circuit card is positioned within the housing and around the retaining flange portion of the input shaft.

11. The transducer switch of claim 1, wherein the plurality of strain gauges includes a first strain gauge and a second strain gauge, the first strain gauge and the second strain gauge being positioned approximately ninety degrees apart on the sensing portion of the input shaft such that the first strain gauge measures compression and tension associated with the input shaft being moved along the X axis and the second strain gauge measures compression and tension associated with the input shaft being moved along the Y axis.

12. The transducer switch of claim 11 wherein the first strain gauge and the second strain gauge are wired in a half Wheatstone Bridge configuration with a first leg of the half Wheatstone Bridge including the first strain gauge and a first completion resister, a second leg of the half Wheatstone Bridge including the second strain gauge and a second completion resister.

13. The transducer switch of claim 11, wherein the plurality of strain gauges includes a third strain gauge and a fourth strain gauge, each of the first, second, third, and fourth strain gauges positioned ninety degrees apart on the sensing portion of the input shaft such that the first and third strain gauges measure compression and tension associated with the input shaft being moved along the X axis and the second and fourth strain gauges measure compression and tension associated with the input shaft being moved along the Y axis.

14. The transducer switch of claim 13, wherein the first, second, third, and fourth strain gauges are wired in a full Wheatstone Bridge configuration with a first leg of the full Wheatstone Bridge including the first and third strain gauges, a second leg of the full Wheatstone Bridge including the second and fourth strain gauges.

* * * * *